Feb. 14, 1961  F. M. MAYES  2,971,378
TANK GAUGE
Filed July 11, 1955  2 Sheets-Sheet 1

INVENTOR.
FRED M. MAYES
BY
ATTORNEYS

Feb. 14, 1961    F. M. MAYES    2,971,378
TANK GAUGE
Filed July 11, 1955    2 Sheets-Sheet 2

INVENTOR.
FRED M. MAYES
BY
ATTORNEYS

United States Patent Office 2,971,378
Patented Feb. 14, 1961

2,971,378

TANK GAUGE

Fred M. Mayes, Newtown Square, Pa., assignor to Sun Oil Company, Philadelphia, Pa., a corporation of New Jersey Filed July 11, 1955, Ser. No. 521,098

20 Claims. (Cl. 73—313)

This invention relates to tank gauges and, particularly, to means operating automatically to transmit tank gauge readings to a remote recording or reading location.

Various commercial tank gauges are known utilizing floats as the level sensing element controlling directly a tape or wire which gives the interface position in terms of positions of a pair of electrical potentiometers driven by the tape or wire. Connections to these potentiometers which are located at the tank serve to provide signals for remote reading. The potentiometers are so arranged that one gives readings in terms of a large unit, such as feet, while the other gives readings in terms of fractions of a foot, the potentiometers being geared to the tape or wire so that the latter will make a complete revolution throughout its full range for a relatively small movement of the other. One of the difficulties with such a system is the necessity for using four wires between the transmitter and receiver. One of the objects of the present invention is to provide a system in which only two wires are required between the tank and the receiver location. In brief, this end is accomplished by providing a double bridge using alternating current for the excitation of one bridge unit and direct current for the other.

A further difficulty in the use of potentiometers is that their drive imposes friction which must be overcome by force exerted by virtue of the relationship of the float to the liquid surface, this introducing possible error in readings. In accordance with the present invention, such friction error is eliminated by involving in the making of a reading positive movement of the float under the action of a driving motor. In brief, in the making of each reading the float is either raised or lowered to a predetermined extent and the signal relationship between it and the liquid which is indicative of the liquid surface level provides an output which is used to fix an indication or recording of the level.

In connection with the latter aspect of the invention, it is desirable to make use of certain features disclosed and claimed in my prior application Serial No. 506,056, filed May 4, 1955, now Patent No. 2,930,131. Involved in this is the provision of means continuously responsive to increase of tension on the supporting tape or wire of a float as the float is raised, or decrease of tension as the float is lowered. In an apparatus of the first type, as the float is raised through the liquid surface the tension on the supporting tape or wire increases until the float leaves the liquid whereupon the tension becomes constant. At the time at which, or related to which, the tension becomes constant, a signal is emitted which is indicative of the precise time at which the float leaves the liquid. In an apparatus of the second type, the tension is constant as the float approaches the liquid surface moving downwardly and starts to decrease as soon as the float reaches the liquid. A signal emitted when the tension starts to decrease then indicates the time at which the float enters the liquid. The object of such arrangement is to eliminate or minimize error due to coating of the float, changing its effective weight, or due to currents which may exist in the liquid.

The attainment of the foregoing objects of the invention and other objects thereof particularly relating to details of construction and operation will become apparent from the following description read in conjunction with the accompanying drawings, in which.

Figures 2, 4:
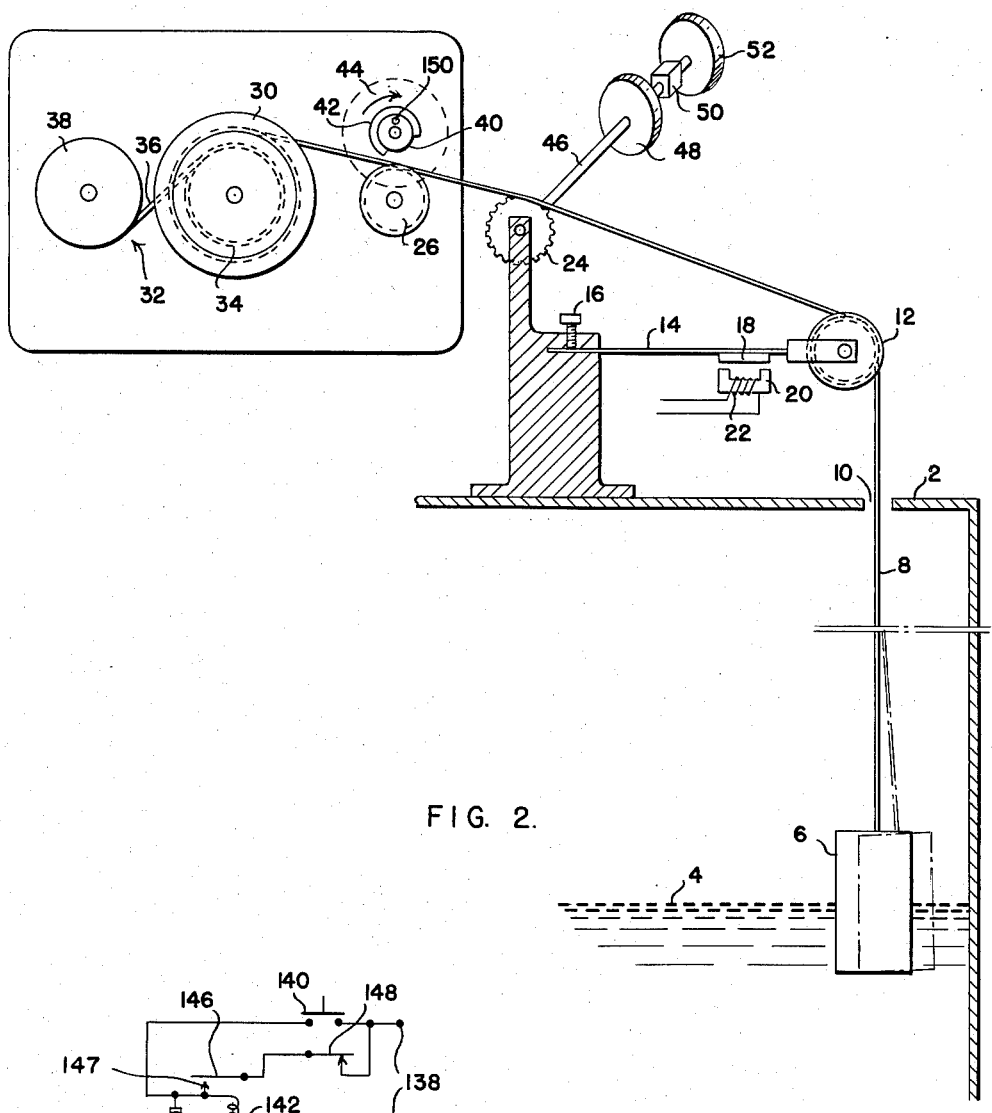
Figure 2 is a diagrammatic and sectional view showing the improved gauging means associated with a tank.
Figure 4 is a wiring diagram showing the control arrangement for the tape driving motor.

Referring first to Figure 2 there is indicated at 2 the upper portion of a tank containing the liquid 4 which is to be gauged. A float 6 is suspended in the liquid buoyed thereby and subject to constant tension, while the float is stationary, of a tape 8 which extends through an opening 10 in the top of the tank and is trained about a pulley 12 carried by a spring cantilever 14 the end of which is rigidly anchored at 16. The cantilever 14 is desirably relatively stiff and carries at an outer portion thereof, subject to substantial deflection, an armature member 18 which is associated with a core 20 of an electromagnetic transducer the winding of which is indicated at 22. The armature member 18 and the core 20 are, in all conditions of operation, separated by an air gap which varies with displacement of the spring 14 and, accordingly, with the force exerted on the pulley 12 by the tape 8. The effective inductance of the coil 22 correspondingly changes in approximately linear relationship to the deflection, though such linearity is not essential.

Alternatively, the member 18 may be a magnet variably movable to saturate, more or less, the core 20, thereby giving a variable reactance; or, if exciting and secondary windings are used, an armature 18 may provide a variable mutual inductance to produce a signal variable with deflection.

From the pulley 12 the tape 8 extends laterally over a sprocket wheel 24 which is provided with teeth engaged in evenly spaced openings in the tape 8 so that rotation of the sprocket 24 is linearly related to movement of the tape. The tape then passes in contact with a pulley 26 to a reel 30 on which the tape is wound. A constant tension spring arrangement tends to impart substantially constant tension to the tape, this arrangement comprising a reel 34 secured to the reel 30, a flat spring 32 and a reel 38 which freely rotates in bearings. Such constant tension spring arrangements are well known. Complete constancy of this tension is not material in the preferred form of the invention since all that is required in that case is the maintenance of the tape 8 in normally stretched condition.

Associated with the pulley 26 is a roller 40 which is provided with friction material 42 about its circumference except for an interrupted portion as indicated in Figure 2. A motor 44 is arranged to rotate the roller 40 in a clockwise direction during gauging operation to bring the surface 42 into feeding engagement with the tape 8 to raise the float, the float being released when the surface 42 disengages the tape. The motor 44 is of the type incorporating gearing so that the raising of the tape proceeds slowly.

The sprocket 24 drives through a shaft 46 a potentiometer 48 of rotary type and through reduction gearing indicated at 50 a second potentiometer 52 also of rotary type. The arrangement is such that the potentiometer 48 passes through a complete rotation and a complete range of electrical variation through movement, for example, of one foot of the tape 8. The potentiometer 52, on the other hand, may move only a fraction of a complete rotation for one foot movement of the tape, the potentiometers thus serving for fine and coarse measurements of the float position.

Figure 1:
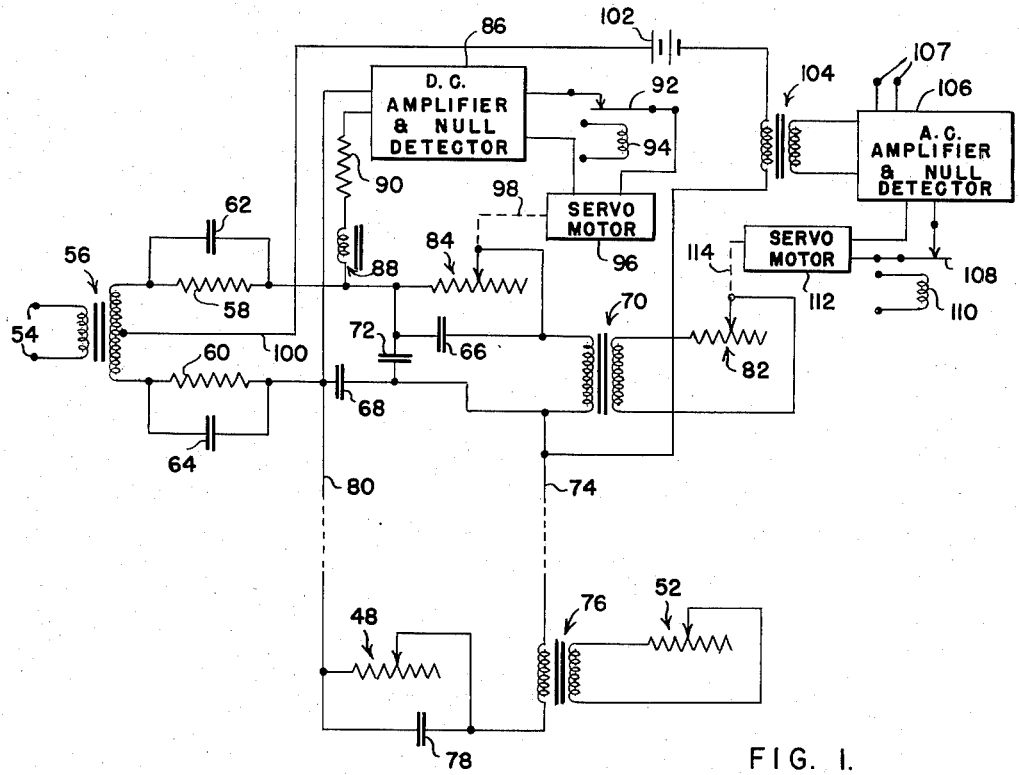
Figure 1 is a wiring diagram showing the electrical connections of the bridge arrangements used.

Reference may now be made to Figure 1 which shows the bridge arrangements referred to above. Excitation is provided at terminals 54 which may be connected to the conventional 60 cycle power supply or to any other desirable source of alternating current. These terminals are connected to the primary of a transformer 56 the ends of the secondary of which are connected to the respective parallel arrangements of resistors 58 and 60 and capacitors 62 and 64. The other ends of these arrangements are connected through capacitors 66 and 68 to the primary winding of a transformer 70, there being shunted across the arrangement at 72 a capacitor to obtain approximate balance of the capacity of the remote connecting line. The lower terminal of the primary of transformer 70, as shown, is connected through one conductor of a cable to the primary of a transformer 76 across the secondary of which there is connected the potentiometer 52 previously referred to which is actually connected as a variable resistance. (Potentiometers have been referred to because the accurate elements desirably involved at 48 and 52 are sold commercially as potentiometers, though, as used in the present circuit, they are connected as variable resistors.) The lower end of the primary of transformer 76 is connected through the parallel arrangement of capacitor 78 and potentiometer 48 to the cable conductor 80 which runs to the junction between resistor 60 and capacitor 68. The conductors 74 and 80 are those of a two-conductor cable which runs between the tank and the receiving or reading or recording station. This may be very remote from the tank. The elements which are local to the tank are those connected to the lower ends of the conductors 74 and 80, while the elements at the receiving station are those connected to the upper ends of these conductors.

The secondary of transformer 70 has shunted across it a potentiometer 82 desirably of precision type which is connected as a variable resistance. For reading, the contact of this potentiometer is connected to a pointer, not shown, associated with a scale.

Connected across the capacitor 66 is a potentiometer 84, similar to potentiometer 82, and also connected as a variable resistance and furnished with a pointer and a scale for direct reading.

A direct current amplifier and null detector 86 is connected between the ends of the resistors 58 and 60 which are remote from the secondary winding of the transformer 56, the connections including a choke 88 and a suitable resistor 90, the choke being provided to minimize the flow of alternating signal to the amplifier 86. The output of the amplifier 86 is delivered to a servo motor 96 through the contacts 92 of a relay provided with an actuating coil 94. The servo motor 96 serves to drive through mechanical connection 98 the contact of the potentiometer 84.

To a center tap of the secondary of transformer 56 there is connected the line 100 which includes a battery 102 and the primary winding of a transformer 104, connection being to the receiver end of the conductor 74. The secondary of transformer 104 feeds an alternating current amplifier and null detector 106 the output of which drives the servo motor 112 through connections including the contacts 108 of a relay having the energizing coil 110. The servo motor 112 serves to drive through mechanical connections 114 the contact of potentiometer 82.

The two amplifiers and null detectors 86 and 106 are of conventional types providing outputs depending upon the sign or phase of the inputs to drive reversibly the respective servo motors 96 and 112. Assuming motor 112 to be of direct current type, reversible with change of polarity of its input, amplifier 106 should be of phase-sensitive type provided with a phase reference input from terminals 107 supplied from the same alternating source as terminals 54.

What has been so far described, with certain of the described elements either inoperative or missing, constitutes a complete embodiment of one form of the invention, and the operation will accordingly be described from this standpoint. The relay coils 94 and 110 may be considered deenergized or, alternatively, permanent connections made in the circuit of Figure 1 in place of the relay contacts at 92 and 108. In the case of Figure 2, it may be considered that the armature and core arrangement 18, 20 is omitted or inactive, and the tape drive involved in the roller arrangement 40 may be considered absent or inoperative. Under these conditions, changes in level of the liquid 4 would cause the float 6 to rise or fall correspondingly due to the substantially constant tension in the tape 8 imposed by the spring arrangement at 32. (In this type of operating the spring arrangement at 32 should impose nearly constant tension so as to maintain the position of the float with respect to the liquid surface substantially constant.) Drive of the potentiometers 48 and 52 would take place in correspondence with the float position. With these assumptions, operation would be as follows:

Examination of Figure 1 will reveal that it contains two essentially independent bridges, one operating on direct current and the other on alternating current.

For the direct current bridge, the energizing input is through battery 102 to the terminals constituted essentially by the connection of this battery to the conductor 74 and the connection of the battery to the center tap of the secondary of transformer 56. The detecting terminals of the direct current bridge are constituted by the right-hand terminals of the resistors 58 and 60. Two essentially equal arms of the direct current bridge are constituted by the resistors 58 and 60 and the two portions of the secondary of transformer 56 on either side of the center tap. Another arm of the bridge is constituted by the variable resistor 84 and the resistance of the primary of transformer 70. The fourth arm of the bridge is constituted by the variable resistor 48 and the primary of transformer 76. The secondary circuits of transformers 70 and 76 are immaterial to the direct current characteristics of the bridge, and it will be evident that the bridge is balanced when the resistances in the two arms last mentioned are equal, i.e., the resistance offered at 84 is the same as the resistance offered at 48, assuming the primary resistances of transformers 70 and 76 equal. The resistance at 48 is affected by the float position. When the bridge is unbalanced, the amplifier and null detector 86 drives the servo motor 96 to adjust the resistance at 84 to equality with that at 48. The final indication of resistance 84 when the adjustment is automatically completed is, accordingly, a measure of the position of the potentiometer 48 giving a fractional foot indication of the position of float 6, consistently with what has already been described.

Considering now the alternating characteristics of the arrangement, the capacitors at 62, 64, 66 and 78 may be considered as offering low reactance to the alternating current, effectively eliminating the resistances at 58, 60, 84, and 48. As above stated, the capacitance at 72 is provided to balance the line capacitances, and the effective input terminals of the bridge are provided at the respective upper and lower terminals of the primaries of the transformers 70 and 76. These transformers may be considered identical. The terminals of the bridge across which detection is provided are the center tap of the secondary of transformer 56 and the line 74. The arms of the bridge are then constituted by the two portions of the secondary of transformer 56 on either side of the center tap, and the impedances provided at the primaries of the transformers 70 and 76. The latter impedances are varied by the adjustments of the resistances at 82 and 52, respectively. A signal indicative of unbalance is emitted through the transformer 104 to the amplifier and null detector 106 which drives the servo motor 112 which in turn adjusts the variable resistance at 82 to equality with that appearing at 52. The latter is dependent upon float position and serves to indicate the large scale movements of the float. The position of the float accordingly is indicated by the final reading of the variable resistance at 82 when a balanced condition from the alternating current standpoint is achieved.

It will be evident from the above that the dual bridge arrangement involves independence of the constituent direct current and alternating current bridges. Accordingly, independent indications are obtained of the coarse and fine scale indications of the float position, the indications afforded at 82 being, for example, of feet while the indications at 84 are of fractions of a foot. The particular advantage of what has been described is the minimizing of the number of conductors running from the reading station to the tank, only two conductors 74 and 80 being required. In arrangements heretofore used, additional conductors were required providing for connections to completely independent bridges. This economy of conductors is particularly desirable since it is usually desirable to provide a single set of apparatus at the receiver for securing indications from a large number of tanks, arrangements being made to switch the receiver connections to pairs of conductors 74 and 80 corresponding to the number of tanks from which readings are to be obtained. Provisions for such switching are conventional and need not be described in detail.

What has been so far described may be substituted for equal accuracy for potentiometer-type gauges such as are presently on the market. Such gauges, however, involve small errors due to friction involved in the drive of potentiometers from a float such as 6. Other errors may be introduced due to the fact that the float 6 may become coated with material changing its weight in unknown fashion, and also due to lateral shifts in position of the float due to liquid currents in the tank. Such errors are substantially reduced by the provision of additional devices which will now be described.

Figure 3:
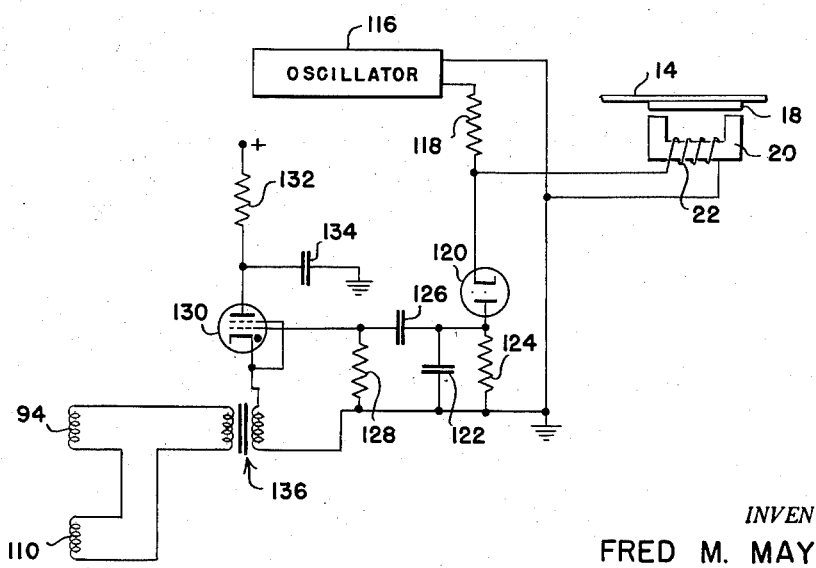
Figure 3 is a wiring diagram showing, particularly, the means for emitting a signal when the float leaves the liquid surface.

Referring particularly to Figure 3, there is indicated at 116 an oscillator which supplies through resistor 118 an energizing current to the coil 22 mounted on the core 20. The current supplied by the oscillator 116 may be at any suitable frequency, for example, a relatively high audio frequency. Connected to the lower end of resistor 118, as shown, is the cathode of a diode 120, the anode of which is connected through resistor 124 to ground, to which there is also connected a terminal of the oscillator which is not connected to resistor 118. Shunted across the resistor 124 is a capacitor 122 and also the arrangement of a capacitor 126 and resistor 128, there being provided by these elements a filter. The ungrounded terminal of resistor 128 is connected to the control grid of a thyratron 130 the anode of which is connected through resistor 132 to a source of positive potential and through capacitance 134 to ground. The cathode of thyratron 130 is connected through the primary of a transformer 136 to ground. The secondary of the transformer 136 is connected to the series arrangement of the relay coils 94 and 110. Relays involving these coils are desirably of alternating current type.

A thyratron circuit is such that, with its grid at ground potential, pulsing occurs due to the RC circuit involving resistor 132 and capacitor 134, the pulsing taking place at a suitable frequency such that the effective alternating current delivered to relay coils 94 and 110 is such as to energize these relays and open the contacts at 92 and 108. Figure 4 illustrates certain control connections for the motor 44. The commercial alternating supply is at terminals 138. The upper of these terminals is connected through starting button 140, normally open, to the upper terminal of the motor 44 and the upper terminal of a relay coil 142, both of these elements having return connection to the lower terminal 138 through a resistor 144. The armature of relay 142 is indicated at 146 and is normally open with respect to its contact 147 which is connected to the upper terminals of the motor 44 and relay coil 142. The armature 146 is connected through a switch 148 to the upper terminal 138. This switch 148 is normally closed but is arranged to be opened during operation of the motor 44 by a pin 150 carried by the drive roller 40.

The complete operation of the system may now be described.

Prior to the making of a reading, it may be assumed that the positive supply of potential to the thyratron 130 is cut off so that no pulsing of the thyratron occurs, and, consequently, the relay coils 94 and 110 are deenergized and contacts are made at 92 and 108. Assuming that the circuit of Figure 1 is energized, the servo motors will then have attained balance of the bridges in correspondence with the position of the float which will be initially clear of the liquid surface as the result of a previous operation, as will hereafter appear. The indications of level would then be spurious and should be disregarded at this point of the operation. If the positive potential is now applied to the anode of thyratron 130, pulsing starts to produce opening of the relay contacts at 92 and 108. The push button switch 140 is then closed and held closed until the pin 150 permits switch 148 to close whereupon the energization of the motor 44 becomes continuous through the locking-in action of the relay 142. Push button 140 may accordingly be released. As drive roller 40 rotates in the direction of the arrow in Figure 2, its surface 42 will first disengage the tape 8 permitting the float to drop into the liquid and will then reengage the tape, driving the same to raise the float 6. As the float 6 rises, the relationship of the armature 18 to core 20 changes to produce a variation of the oscillator signal appearing at the cathode of diode 120.

Prior to the beginning of rise of tape 8, an alternating signal will be applied to diode 120, but will be of constant amplitude providing a constant direct potential at the ungrounded terminal of capacitor 122 which serves to pass the alternating components of the rectified signal. Accordingly, there will be no signal delivered through capacitor 126 and the grid of thyratron 130 will be at ground potential. Pulsing, accordingly, will take place resulting in opening of the contacts at 92 and 108. As movement of the tape occurs by the driving action of surface 42, raising the float 6 the beam 14 will be continuously deflected downwardly with a resulting change in the reluctance of the arrangement 18, 20 and with variation of the signal applied to diode 120. This, in turn, changes the negative potential of the ungrounded terminal of capacitor 122 providing a negative signal to the grid of the thyratron to stop its pulsing. Accordingly, the relay coils 94 and 110 are deenergized closing the corresponding contacts at 92 and 108 and again rendering operative the bridge circuits in Figure 1 to cause the servo motors to balance substantially continuously the bridge circuits for the resulting variations in the potentiometers 48 and 52. This condition continues until the instant when the float 6 leaves the liquid surface whereupon the variation of deflection of the beam 14 ceases with the result that the oscillator signal applied to diode 120 becomes constant. The signal applied to the thyratron grid becomes zero and, accordingly pulsing of the thyratron is resumed with reenergization of the relay coils 94 and 110 to open the contacts at 92 and 108. With suitable choice of the circuit constants and sufficiently slow movement of the tape to permit substantially continuous balancing of the bridges, the servo motors 96 and 112 are thus brought to rest substantially the moment that the float 6 leaves the liquid surface and the indicators associated with the variable resistors 84 and 82 then indicate the float position at this instant of its leaving the liquid surface. Adjustments are so made that the float 6 will rise clear of the liquid surface before the drive is interrupted by the opening of switch 148 by pin 150, the drive being interrupted while the surface 42 engages the tape to hold the float clear of the liquid. Since the thyratron 130 will continue to pulse, holding the contacts 92 and 108 open, the indication previously secured is held until the positive potential is removed from the thyratron anode.

In this arrangement, the calibration of the indicators is, of course, such as to indicate the liquid level when the float just leaves the surface. The advantage of arrangement is, of course, primarily in that there is independence of friction and possible change of weighting of the float due to deposits thereon. Friction is eliminated as a cause of error since the potentiometers are positively driven directly in accordance with the float movements. By causing the indication to represent the condition attained when the float leaves the liquid, there is substantially complete independence of change of weight of the float which might result in substantial variation of its degree of submergence if the system was operated as first described without the utilization of the matters involved in Figures 3 and 4. Furthermore, currents in the liquid do not constitute a source of error since, as the float is lifted gradually, the surface presented to the liquid is reduced and the float approaches closer and closer to a position such that the tape 8 is vertical, a vertical condition of the tape being susbtantially assured at the instant that the float leaves the liquid surface.

It will be evident that the same type of results are secured if the float is lowered into the liquid, the various circuit and mechanical arrangements being then suitably reversed. Various other details may be modified without departing from the invention as defined in the following claims. For example, in the system last described simplification may be provided by ending the cycle with the float free, in which case enough time for reading the dials should be provided between the instant the float emerges and the opening of the motor circuit. Or, alternatively, manual control of the motor 44 may be provided.

What is claimed is:

1. Apparatus for gauging liquid level comprising a member movable with changes of the liquid level, a pair of variable impedances, means connecting said impedances to said member for different variations in response to movements of said member, a single balanceable circuit including said impedances and a pair of balancing impedances, each of said first mentioned impedances providing in said circuit substantially different responses to direct and alternating excitation, means providing both direct and alternating excitation for said balanceable circuit, and separate means automatically effecting, respectively, direct and alternating current balance of said circuit.

2. Apparatus according to claim 1 in which said variable impedances are connected to the other elements of said balanceable circuit through a single pair of conductors.

3. Apparatus for gauging liquid level comprising a member movable with changes of the liquid level, a pair of variable impedances, means connecting said impedances to said member for different variations in response to movements of said member, a transformer having a primary and a secondary, means connecting one of said impedances across the secondary of said transformer, means connecting the other of said impedances in series with the primary of said transformer, a capacitance shunting the last mentioned impedance, a single balanceable circuit including the series arrangement of the last mentioned impedance and the primary of said transformer and a pair of balancing impedances, means providing both direct and alternating excitation for said balanceable circuit, and separate means automatically effecting, respectively, direct and alternating current balance of said circuit.

4. Apparatus according to claim 3 in which said series arrangement of an impedance and transformer primary is connected to the other elements of said balanceable circuit through a single pair of conductors.

5. Apparatus for gauging liquid level comprising a member movable with changes of the liquid level, a pair of variable impedances, means connecting said impedances to said member for simultaneous different variations in response to movements of said member, means including balanceable circuits incorporating said impedances for indicating variations of said impedances, means for imparting vertical movement to said member relative to said liquid level, and means providing a signal upon the attainment of a predetermined position of said member with respect to the liquid surface.

6. Apparatus for gauging liquid level comprising a member movable with changes of the liquid level, a pair of variable impedances, means connecting said impedances to said member for different variations in response to movements of said member, a single balanceable circuit including said impedances and a pair of balancing impedances, each of said first mentioned impedances providing in said circuit substantially different responses to direct and alternating excitation, and said balancing impedances having different responses to direct and alternating excitation to balance individually the first mentioned impedances, means providing both direct and alternating excitation for said balanceable circuit, and separate means indicative, respectively, of direct and alternating current balance of said circuit.

7. Apparatus according to claim 6 in which said variable impedances are connected to the other elements of said balanceable circuit through a single pair of conductors.

8. Apparatus according to claim 6 in which said member is subject to buoyancy changes in traversal of a liquid surface, and comprising an elongated support for said member, means for imparting vertical movements to said support and member, and means providing a signal upon the attainment of a predetermined position of said member with respect to the liquid surface.

9. Apparatus according to claim 6 in which said member is subject to buoyancy changes in traversal of a liquid surface, and comprising an elongated support for said member, means for imparting vertical movements to said support and member, and means responsive to variations in tension of said support during vertical movements thereof to provide an output signal continuously corresponding to said tension variations.

10. Apparatus according to claim 6 in which said member is subject to buoyancy changes in traversal of a liquid surface, and comprising an elongated support for said member, and means for imparting vertical movements to said support and member, and means responsive to variations in tension of said support during vertical movements thereof to provide an output signal indicative of cessation of variations of said tension.

11. Apparatus according to claim 6 comprising an elongated support for said member, means for imparting vertical movements to said support and member, and means providing a signal upon the attainment of a predetermined position of said member with respect to the liquid surface 12. Apparatus according to claim 8 in which said variable impedances are connected to the other elements of said balanceable circuit through a single pair of conductors.

13. Apparatus according to claim 9 in which said variable impedances are connected to the other elements of said balanceable circuit through a single pair of conductors.

14. Apparatus according to claim 10 in which said variable impedances are connected to the other elements of said balanceable circuit through a single pair of conductors.

15. Apparatus for gauging liquid level comprising a member movable with changes of the liquid level, a pair of variable impedances, means connecting said impedances to said member for different variations in response to movements of said member, a transformer having a primary and a secondary, means connecting one of said impedances across the secondary of said transformer, means connecting the other of said impedances in series with the primary of said transformer, a capacitance shunting the last mentioned impedance, a single balanceable circuit including the series arrangement of the last mentioned impedance and the primary of said transformer and a pair of balancing impedances, said balancing impedances having different responses to direct and alternating excitation, means providing both direct and alternating excitation for said balanceable circuit, and separate means indicative, respectively, of direct and alternating current balance of said circuit.

16. Apparatus according to claim 15 in which said series arrangement of an impedance and transformer primary is connected to the other elements of said balanceable circuit through a single pair of conductors.

17. Apparatus for gauging liquid level comprising a member movable with changes of the liquid level, a pair of variable impedances, means connecting said impedances to said member for different variations in response to movements of said member, inductance-providing means coupled to one of said impedances, means connecting the other of said impedances in series with said inductance-providing means, a capacitance shunting the last mentioned impedance, a single balanceable circuit including the series arrangement of the last mentioned impedance and said inductance-providing means and a pair of balancing impedances, said balancing impedances having different responses to direct and alternating excitation, means providing both direct and alternating excitation for said balanceable circuit, and separate means indicative, respectively, of direct and alternating current balance of said circuit.

18. Apparatus according to claim 17 in which said series arrangement of an impedance and said inductance-providing means is connected to the other elements of said balanceable circuit through a single pair of conductors.

19. Apparatus comprising a pair of variable impedances, a transformer having a primary and a secondary, means connecting one of said impedances across the secondary of said transformer, means connecting the other of said impedances in series with the primary of said transformer, a capacitance shunting the last mentioned impedance, a single balanceable circuit including the series arrangement of the last mentioned impedance and the primary of said transformer and a pair of balancing impedances, said balancing impedances having different responses to direct and alternating excitation, means providing both direct and alternating excitation for said balanceable circuit, and separate means indicative, respectively of direct and alternating current balance of said circuit.

20. Apparatus comprising a pair of variable impedances, inductance-providing means coupled to one of said impedances, means connecting the other of said impedances in series with said inductance-providing means, a capacitance shunting the last mentioned impedance, a single balanceable circuit including the series arrangement of the last-mentioned impedances and said inductance-providing means and a pair of balancing impedances, said balancing impedances having different responses to direct and alternating excitation, means providing both direct and alternating excitation for said balancable circuit, and separate means indicative, respectively, of direct and alternating current balance of said circuit.

References Cited in the file of this patent

UNITED STATES PATENTS

| | | |
|---|---|---|
| 1,212,438 | Bauder | Jan. 16, 1917 |
| 2,032,016 | Hitner | Feb. 25, 1936 |
| 2,073,948 | Schofield | Mar. 19, 1937 |
| 2,289,202 | McCoy | July 7, 1942 |
| 2,437,449 | Ames | Mar. 9, 1948 |
| 2,517,455 | Waters | Aug. 1, 1950 |
| 2,551,983 | Wagner | May 8, 1951 |
| 2,557,488 | White | June 19, 1951 |
| 2,627,660 | Smith | Feb. 10, 1953 |
| 2,657,577 | Falk | Nov. 3, 1953 |
| 2,683,371 | Droin | July 13, 1954 |

FOREIGN PATENTS

| | | |
|---|---|---|
| 435,441 | Great Britain | Sept. 20, 1935 |